United States Patent [19]
Herbert

[11] Patent Number: 6,000,037
[45] Date of Patent: Dec. 7, 1999

[54] METHOD AND APPARATUS FOR SYNCHRONIZING DATA TRANSFER

[75] Inventor: Brian K. Herbert, Colorado Springs, Colo.

[73] Assignee: LSI Logic Corporation, Milpitas, Calif.

[21] Appl. No.: 08/996,528

[22] Filed: Dec. 23, 1997

[51] Int. Cl.⁶ ..................................................... G06F 1/12
[52] U.S. Cl. .......................................... 713/400; 710/129
[58] Field of Search .................................... 395/551, 552, 395/553; 365/189.04, 221, 205, 376; 713/400, 401, 500, 503, 600; 710/126, 129, 52, 53

[56] References Cited

U.S. PATENT DOCUMENTS

| | | | |
|---|---|---|---|
| 4,535,427 | 8/1985 | Jiang | 365/205 |
| 4,862,419 | 8/1989 | Hoberman | 365/221 |
| 4,891,788 | 1/1990 | Kreifels | 365/49 |
| 5,345,419 | 9/1994 | Fenstermarker et al. | 365/189.04 |
| 5,471,583 | 11/1995 | Au et al. | 395/250 |
| 5,598,448 | 1/1997 | Girardeau, Jr. | 375/376 |
| 5,754,833 | 5/1998 | Singh et al. | 395/551 |

*Primary Examiner*—Joseph E. Palys
*Assistant Examiner*—Omar A. Omar

[57] ABSTRACT

A method for transferring data from a first clock domain to a second clock domain. A first clock signal is generated for the first clock domain from a base clock signal. A second clock signal is generated for the second clock domain from the base clock signal. A phase relationship is detected between the first clock signal and the second clock signal. Data is transferred from the first clock domain to the second clock domain using the phase relationship between the first clock signal and the second clock signal.

37 Claims, 7 Drawing Sheets

METHOD AND APPARATUS FOR SYNCHRONIZING DATA TRANSFER

CROSS REFERENCE TO RELATED APPLICATION

The present invention is related to the subject matter of co-pending U.S. patent application, Ser. No. 08/996,730, entitled Method and Apparatus for Synchronizing Data, filed Dec. 23, 1997. The content of the aforementioned United States patent application is hereby incorporated by reference.

BACKGROUND OF THE INVENTION

1. Technical Field

The present invention relates to an improved data processing system and in particular to a method and apparatus for transferring data within a data processing system. Still more particularly, the present invention relates to a method and apparatus for synchronizing data transfer between components operating at different speeds within a data processing system.

2. Description of the Related Art

The designs of digital computers and work stations continue to evolve at a rapid pace as new processors (microprocessors/CPUs) become available and are integrated with input/output (I/O) resources into advanced versions of such systems. Though the widths of the multiple buses commonly present in such systems often vary from model to model, the prevailing and evolutionary changes between models tend to be associated with the clock rates of the processors. Namely, it is very common for a fundamental system design to be upgraded with faster processors in half a year or less increments of a model's life cycle. The problem is that the system boards are designed with buses and associated hardware which operate over a first relative frequency range while the processor clock frequencies vary over a second range of fundamentally higher frequencies.

A typical computer system is commonly comprised of a central processing unit (CPU), memory, and various buses which provide connection to peripherals. A commonly used bus is Peripheral Component Interconnect (PCI) which has become an industry standard. The PCI bus operates at a frequency of 33 MHz (or 66 MHz for limited high speed applications). The CPU may operate at a range of speeds, especially in embedded applications.

Peripherals such as network or storage interface controllers commonly have both clock rates and data transfer rates from the network or storage elements which are different than that supported by a 33 MHz PCI bus. In order to accommodate data transfers between the two different clock domains, an intermediate buffer stores data at one rate and reads out at another rate.

If low latency is desired between the arrival of data from one entity in a first clock domain, and its transfer to a second entity in a second clock domain, the designer is faced with the challenge of determining when data from the other clock domain has been written and is stable. For example, if data is transferred from a 40 MHz entity to a 33 MHz entity, the 40 MHz entity writes data to a register which results in a flag being set to indicate that data is available. The challenge is how to have a system in a second clock domain read the flag signal as soon as possible after data is written by the first clock domain, but to prevent the flag signal from being read while it is in transition which might result in indeterminate levels (metastability) or possibly erroneous values. First in, first out (FIFO) memories have been used to provide the speed matching capabilities between two clock domains. Fall through FIFO memories can accomplish this function, but at increased logic complexity and associated limits in speed of operation. Register based FIFO memories have been used for speed matching but typically incur a delay of one or two clocks to synchronize between the two clock domains.

Therefore, it would be advantageous to have an improved method and apparatus to allow register based FIFO memories to operate without incurring clock delays associated with presently available systems.

SUMMARY OF THE INVENTION

The present invention provides a method for transferring data from a first clock domain to a second clock domain. A first clock signal is generated for the first clock domain from a base clock signal. A second clock signal is generated for the second clock domain from the base clock signal. A phase relationship is detected between the first clock signal and the second clock signal. Data is transferred from the first clock domain to the second clock domain using the detected or calculated phase relationship between the first clock signal and the second clock signal.

Additionally, a transfer of data between the first clock domain to the second clock domain may be synchronized in the situation in which the first clock signal in the first clock domain is generated from a source independent from the second clock signal in the second clock domain. The ratio of one frequency to another is determined along with the phase relationship between the two clock signals during a selected period of time. Then, the phase relationship is predicted for a future period of time. This prediction of the relationship between the two clock signals serves as an input to a control mechanism, which prevents sampling of data and control signals when they are transitioned from one state to another.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
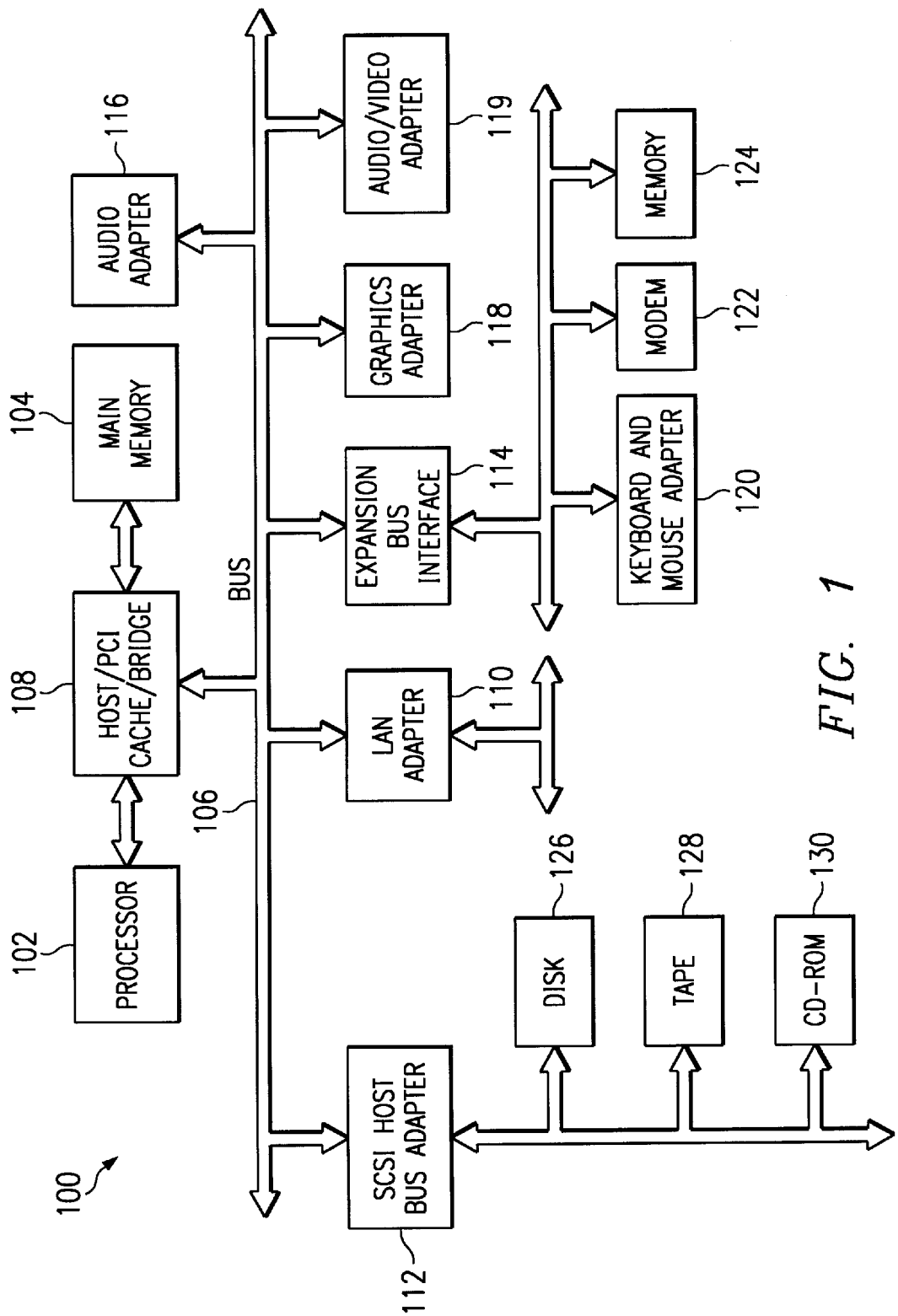
FIG. 1 is a block diagram of a data processing system in the present invention may be implemented.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as, for example, Micro Channel and ISA may be used. Processor 102 and main memory 104 are connected to PCI local bus 106 through host PCI cache bridge 108. Processor 102 in the depicted example is a Pentium processor operating at 266 MHz, which is available from Intel Corporation. Those of ordinary skill in the art will realize that other types of processors may be employed depending on the implementation. Host PCI cache bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors. The depicted example includes four loads on the mother board and three expansion slots.

Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

Figure 2:
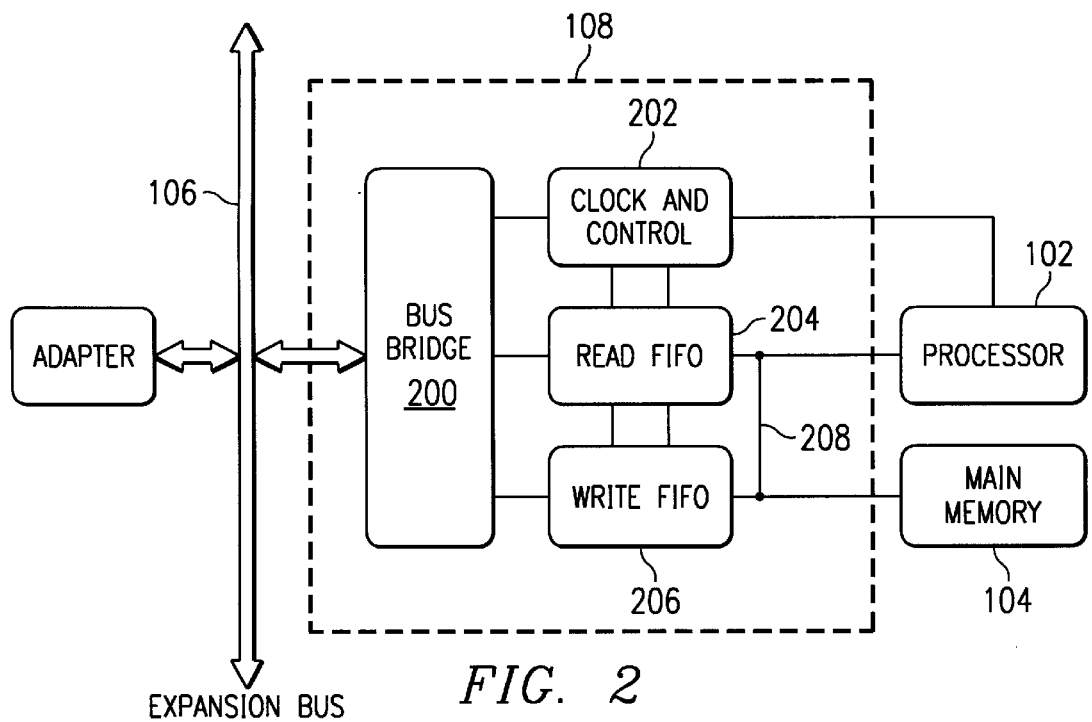
FIG. 2 is a block diagram of a portion of the data processing system in which a preferred embodiment of the present invention may be implemented.

Turning next to FIG. 2, a block diagram of a portion of the data processing system from FIG. 1 is depicted in which a preferred embodiment of the present invention may be implemented. As can be seen in this more detailed view of data processing system 100, host/PCI cache bridge 108 includes a bus bridge 200, a clock and control unit 202, read FIFO memory 204, and write FIFO memory 206. Processor 102, read FIFO memory 204, write FIFO memory 206, and main memory 104 are connected to internal bus 208.

In the depicted example, read FIFO memory 204 and write FIFO memory 206 are first in, first out dual port memories that are employed as a communications path between data producing and separate data consuming processes. These processes are typically independent of each other and are not controlled by a clock speed. Additionally, these processes may be asynchronous with respect to each other. To handle asynchronous processes, a FIFO memory, such as read FIFO memory 204 or write FIFO memory 206, employ internal read and write pointers to sequence through its array of memory locations. A FIFO memory also may employ circuitry to track the difference in value of internal read and write pointers. This circuitry also is employed to output signals, also referred to as flags, when the difference indicates various conditions, such as, for example, that the memory is empty (E), half full (HF), and full (F). Clock and control unit 202 is employed to allow read FIFO memory 204 and write FIFO memory 206 to operate without incurring clock delays in accordance with a preferred embodiment of the present invention. In the depicted example, PCI local bus 106 is operating at 33 MHz while the processor sends data over internal bus 208 at a 40 MHz rate in the depicted example. Of course, depending on the processor employed, other speeds may be employed.

When, in the depicted example, internal bus writes data to PCI local bus 106, which is the expansion bus, the operation begins with internal bus 208 writing data into write FIFO memory 206 at 40 MHz. In the depicted example, the first transfer contains command and address information and subsequent transfers contain data and byte enables. When write FIFO memory 206 enters a not empty condition, this is signalled to bus bridge 200 which asserts a request (REQ) signal to acquire control of the PCI local bus 106. When bus bridge 200 gains access to PCI local bus 106, as signalled by the assertion of a grant (GNT) signal, data is transferred from write FIFO memory 206 to PCI local bus 106 at a maximum rate of 33 MHz per transfer. Data is transferred from internal bus 208 to write FIFO memory 206 until all data has been transferred or until write FIFO memory 206 reaches a full condition, resulting from write FIFO memory 206 being filled with data faster than it is being emptied.

Clock and control unit 202 is employed to generate the clock signal for internal bus 208, and a phase synchronous version of the input clock (the PCI clock in the depicted example) such that phase information may be determined from the two clock signals by clock and control unit 202. Clock and control unit 202 also compares read and write addresses for each FIFO memory, outputting flag signals which indicate if the FIFO is empty, full, or contains some number of empty or full locations. The phase comparison and prediction logic of the control unit in clock and control unit 202 determines when a comparison of read and write addresses may result in unreliable flag signals. When such a determination is made, FIFO flags are held at the previously known state and secondary logic, storing previously known "good" values for flags, permits transfers to continue until some count is attained, or inhibits transfers (read or write independently) until valid FIFO flags are available.

Figure 3:
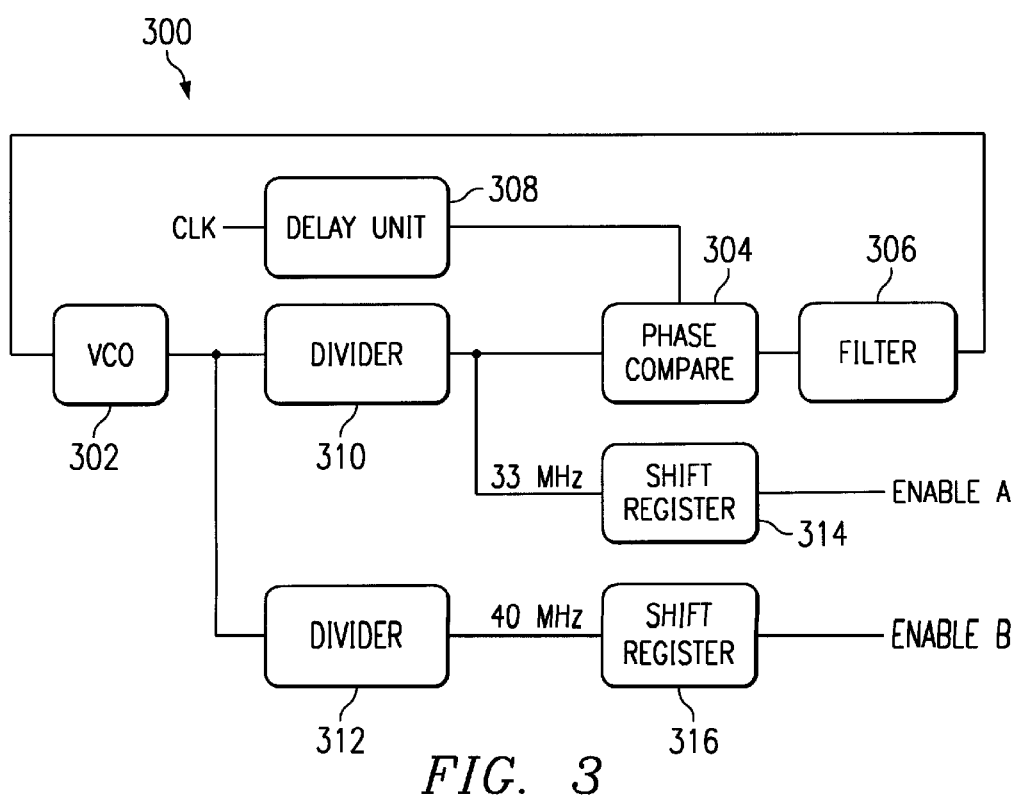
FIG. 3 is a block diagram of a clock circuit within clock and control unit 202 in accordance with a preferred embodiment of the present invention.

Turning next to FIG. 3, a block diagram of a clock circuit within clock and control unit 202 is depicted in accordance with a preferred embodiment of the present invention. Clock circuit 300 includes a phase locked loop formed by voltage controlled oscillator (VCO) 302, phase compare unit 304, and filter unit 306. The input clock signal CLK is fed into phase compare unit 304 through a delay unit 308. Clock circuit 300 also includes a divider 310, a divider 312, a shift register 314 and a shift register 316. Divider 310 is used to generate a 33 MHz clock signal from the input clock signal CLK while divider 312 is used to generate a 40 MHz clock signal from the input clock signal CLK. The delay generated by delay unit 308 is used to match the delay caused by divider 310 such that the 33 MHz clock signal generated by divider 310 is in phase with the input clock signal at phase compare unit 304. If both the 40 MHz clock signal and the 33 MHz clock signal are generated from another clock and are driven by clock circuit 300, delay unit 308 is not needed.

In the depicted example, shift register 314 is a 5 bit register clocked by the 33 MHz clock signal generated by divider 310. Shift register 316 in the depicted example is a 6 bit shift register clocked by the 40 MHz clock signal generated by divider 312. Both shift registers 314 and 316 use the negative edge of the clock signals to shift the contents. The output of shift registers 314 and 316 are fed back to the input to the respective shift registers such that the contents circulate through the shift registers. Shift registers 314 and 316 and dividers 310 and 312 share a reset signal (not shown). This reset signal transitions on the falling edge of the output of VCO 302, which is a 200 MHz signal in the depicted example. Shift registers 314 and 316 are loaded when the reset signal is active. The shift registers are loaded with bit values that enable a FIFO control unit as will be described in more detail below in FIG. 7.

Figure 4:
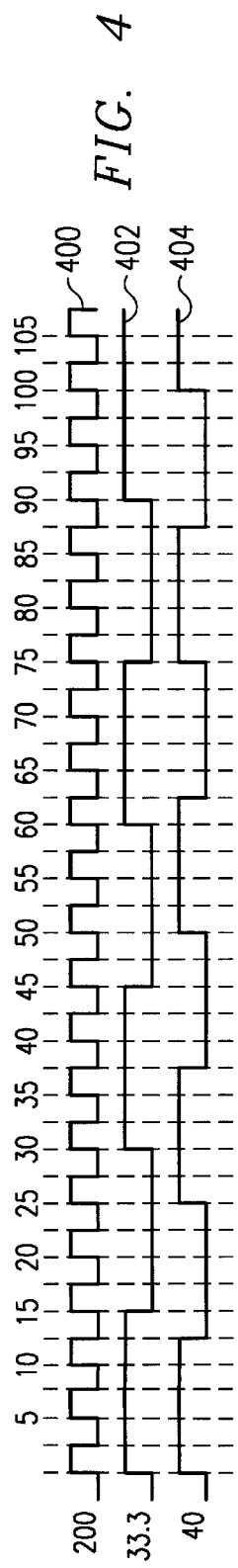
FIG. 4 is a timing diagram of clock signals used in a clock circuit in accordance with a preferred embodiment of the present invention.

Turning now to FIG. 4, a timing diagram of clock signals used in clock circuit 300 in FIG. 3 is depicted in accordance with a preferred embodiment of the present invention. Clock signal 400 is a 200 MHz clock signal. Clock signal 402 is a 33 MHz clock signal, while clock signal 404 is a 40 MHz clock signal. Since both clock signals 402 and 404 are generated from clock signal 400, the edges between clock signals 402 and 404 occur at the same time or are in increments of five nano seconds (ns) apart. In the depicted example, the difference in delay between the clock edges of clock signals 402 and 404 changes by 5 ns each period. For example if a rising edge of clock signal 402 occurs and it is detected that clock signal 404 did not have a rising edge at the same time, it can be inferred that a period of 5 ns will pass before the clock edge of clock signal 404 rises. Alternatively, if it is sensed that the rising edge of clock signal 402 occurs 5 ns after the rising edge of clock signal 404, it may be concluded that the next rising edge of clock signal 402 will occur 10 ns after the next rising edge of clock signal 404.

The relationship between clock signals 402 and 404 may be sensed for each interval or may be sensed for a single relationship (such as both clock edges occurring at the same time) which is then used to synchronize a counter or state machine which provides an indicator of the phase relationship between the two clock signals. Alternately, a reset signal may be supplied to divider 310 and to divider 312 such that upon reset, a known phase relationship between the two clocks is created. In the depicted example, the pattern repeats every six clock cycles for clock signal 404. As a result, a six element sequence is employed to describe the phase of clock signal 402. Similarly, a five element sequence is employed to described the phase of clock signal 404 when viewed from the prospective of rising edges in clock signal 402.

Based upon these relationships and processes for determining phase relationships between clock signals 402 and 404, decisions can be made as to whether to (1) transfer data, update pointers, or both at an upcoming clock edge or (2) wait for a successive clock edge. In making this decision, the speed of the FIFO data and circuitry is taken into account such that such transactions may occur without data corruption or unnecessary delay.

Figure 5:
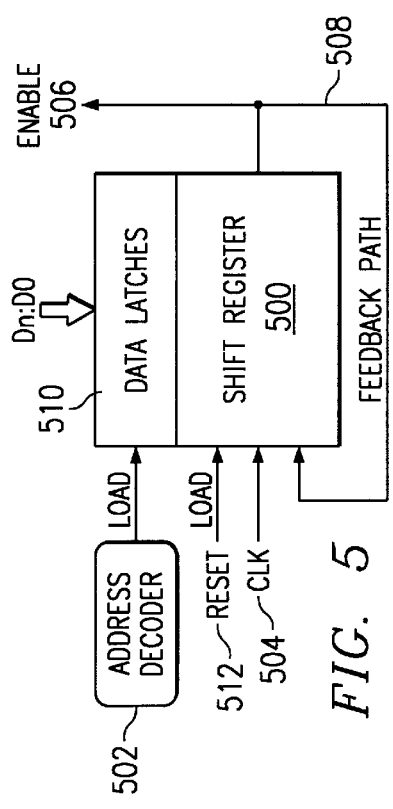
FIG. 5 is a block diagram of a shift register in accordance with a preferred embodiment of the present invention.

With reference now to FIG. 5, a block diagram of a shift register is depicted in accordance with a preferred embodiment of the present invention. Shift register 500 is a shift register such as shift register 314 or shift register 316 in FIG. 3. An address decoder 502 enables a load signal, which transfers a data value from an internal bus (not shown) into data latches 510. Data Dn:D0 which is stored in the data latches 510 is transferred to shift register 500 when the reset signal 512 is active. Clock signal 504 is used to drive shift register 500. Additionally, data Dn:D0 is loaded into shift register 500. This data contains the data used to generate enable signal 506 at the output of shift register 500. Additionally, shift register 500 includes a feed back path 508 that is used to recirculate data Dn:D0 within shift register 500. In the depicted example, shift register 500 is mapped to some address in the data processing system with the address being supplied by address decoder 502. When this address is written, a selected number of data bits, Dn:D0, corresponding with the length of the register is loaded into data latches 510. The length of shift register 500 is selected to correspond to the number of clocks over which the clock relationship repeats. This clock relationship is the number of clocks in which the phase relationship repeats.

Figure 6:
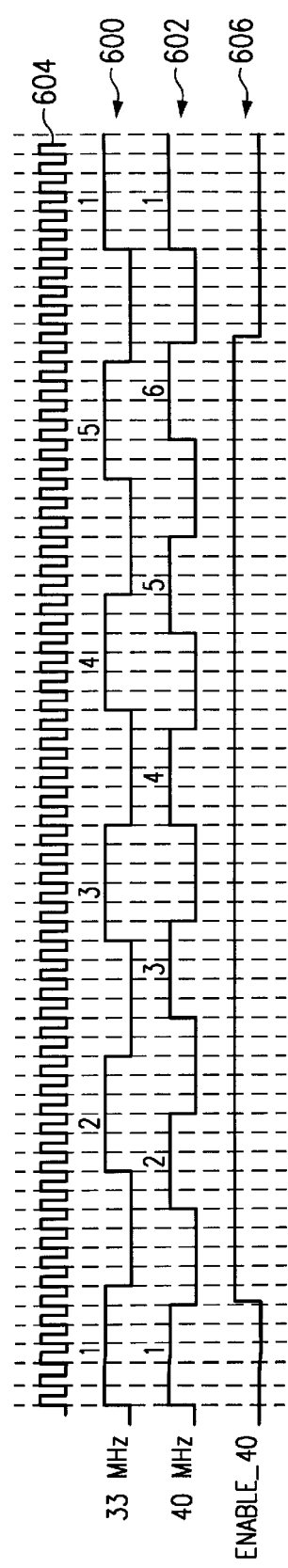
FIG. 6 is a timing diagram of clock signals and an enable signal from a shift register in accordance with a preferred embodiment of the present invention.

Turning to FIG. 6, a timing diagram of clock signals and an enable signal from a shift register is depicted in accordance with a preferred embodiment of the present invention. Clock signal 600 is a 33 MHz clock signal while clock signal 602 is a 40 MHz clock signal with both clock signals being generated from a 200 MHz clock signal 604. Signal 606 is an enable signal generated by a shift register, such as shift register 500 in FIG. 5. This enable signal is used to indicate when FIFO flags are valid and may be used to control data transfers. This determination may include considerations of the data set up and hold times along with the right duration required for a particular implementation. In the depicted example, if a difference of five ns or less is insufficient for a data transfer between a 40 MHz clock domain and a 33 MHz clock domain, an enable signal can be created as illustrated by signal 606 in FIG. 6. The enable signal is generated when sufficient time is present for a data transfer between the clock domains. In this manner, data is not sampled or transferred during a transition and metastability is avoided.

Figure 7:
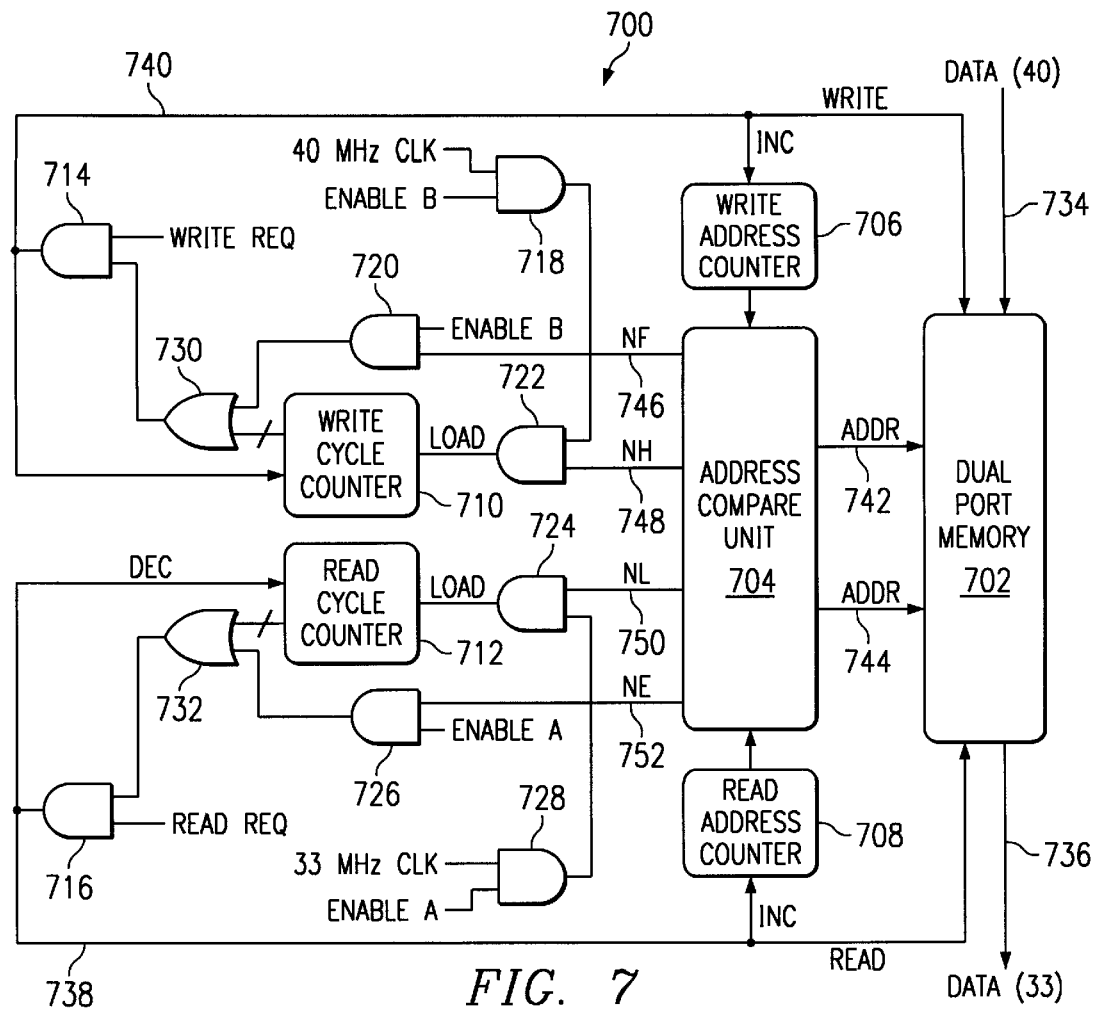
FIG. 7 is a logic diagram of a control circuit within clock and control unit in accordance with the preferred embodiment of the present invention.

With reference now to FIG. 7, a logic diagram of a control circuit within clock and control unit 202 and a FIFO memory from FIG. 2, is depicted in accordance with the preferred embodiment of the present invention. Control circuit 700 is used to control dual ported memory 702, which may be either a read or write FIFO memory, such as read FIFO memory 204 or write FIFO memory 206 in FIG. 2. This configuration, in the depicted example, is an illustration of a FIFO memory system using a dual ported memory implemented as a SRAM, which supports a 40 MHz operation writing data to dual port memory 702 and for a 33 MHz operation for reading data from dual port memory 702. FIFO memory structures are well known in the industry and may be implemented in a number of ways. The depicted example employs a simple dual ported SRAM architecture, however, other types of FIFO memory structures may be used according to the present invention.

Control circuit 700 includes an address compare unit 704, a write address counter 706, a read address counter 708, a write cycle counter 710, and a read cycle counter 712. Additionally, control circuit 700 also includes AND gates 714–728 and OR gates 730 and 732.

Dual port memory 702 in FIG. 7 is illustrative of write FIFO memory 206 of FIG. 2. Data is written into the FIFO from internal bus 208 at a rate of 40 MHz and is read out at a rate of 33 MHz.

Write line 740 results from the write signal of internal bus 208 being qualified through AND gate 714 whose other input indicates that a location is available for data to be written.

Similarly, read line 738 results from the signal to write data to the PCI local bus 106 which is qualified by AND gate 716 whose other input signals that data is available in the FIFO.

Address compare unit 704 receives write addresses and read addresses from write address counter 706 and read address counter 708. These addresses are supplied to dual port memory 702. The write address counter 706 operates in the 40 MHz clock domain and increments when write signal 740 is asserted. Dual port memory 702, however, latches addresses from the read address counter 708 and write address counter 706 on the falling edge of the corresponding clock domain such that incrementing the address with the rising edge of the write signal appears as an increment after write to dual port memory 702. The counters are incremented with the rising edge of the write signal so that address comparison information may be evaluated on the falling edge of the write signal. Address compare unit 704 generates four signals: not full (NF), not high (NH), not low (NL), and not empty (NE) through lines 746–752, respectively. This scheme allows the previous address to be used for accessing the dual ported memory, but as the counter increment to the next location for generating signals (FIFO flags NF, NH, NL, and NE). This system supports an increment after write architecture in which a full condition would be recognized if the read and write pointers have the same value and the last operation was a write. To indicate a full condition before another write operation is attempted, the read and write address counters increment (including rollover) on the positive edge of the clock, but the dual ported memory uses the previous address, which was latched on the falling edge of the clock.

AND gate 718 has its inputs connected to the 40 MHz clock signal from divider 312 in FIG. 3 and the Enable B signal from output of shift register 316. AND gate 728 has its inputs connected to the 33 MHz clock signal generated by divider 310 and the Enable A signal generated by the output of shift register 314. AND gate 720 receives as an input an enable signal (ENABLE B) from a shift register 316 in FIG. 3. Additionally, AND gate 720 has its second input connected to line 746, which is the not full (NF) signal from address compare unit 704. AND gate 726 has its inputs connected to the Enable A signal and to line 752, which supplies the not empty (NE) signal. AND gate 722 has its inputs connected to the output of AND gate 718 and line 748, which provides the not high (NH) signal. AND gate 724 has its inputs connected to the output of AND gate 728 and line 750, which provides the not low (NL) signal. The output of AND gate 722 provides a load signal to write counter 710 while AND gate 724 provides a load signal to read counter 712.

This results in the read cycle counter 712 being loaded with a value equal to the number of data locations which are filled when the not low signal is asserted, each time Enable A is asserted and the rising edge of the 33 MHz clock occurs.

In this way, if Enable A was de-asserted for some period (indicating possible unreliable compare information) and then later asserted, the read cycle counter is re-loaded with the proper count, assuming that the not low flag is asserted when Enable A is again asserted.

Write cycle counter 710 operates in a similar manner, allowing continued operation through period of clock coincidence, and re-loading of said counter when the period of coincidence ends and the not high signal is asserted.

Next, OR gate 730 has its inputs connected to the output of AND gate 720 and write cycle counter 710. OR gate 732 has its inputs connected to the output of AND gate 726 and read cycle counter 712. AND gate 714 has one input connected to receive a write request and its other input connected to the output of OR gate 730. AND gate 716 has one input connected to receive a read request and its other input connected to the output of OR gate 732. The output of AND gate 714 is connected to write line 740 while the output of AND gate 716 is connected to read line 738. Write line 740 also provides a signal to write cycle counter 710, which decrements the counter. Read line 738 also is connected to read cycle counter 712 and provides signals to decrement read cycle counter 712.

A clock edge exists for the 33 MHz clock signal, and for the 40 MHz clock signal in which both clock signals are transitioning at approximately the same time. To prevent this memory system from responding to possible false control signals values resulting from the sampling of transitioning signals, Enable A and Enable B signals from shift registers 314 and 316 in the clock circuit 300 in FIG. 3 are employed.

Address compare unit 704 compares the value of the write address with that of the read address from dual port memory 702. Four different signals may be generated on lines 746–752 as output signals from address compare unit 704. A not low (NL) signal on line 750 indicates that more than a minimum number of locations within dual port memory 702 contain data. This minimum number of locations is equal to the load value of read cycle counter 712 in the depicted example. Likewise, a not high (NH) signal on line 748 is employed to indicate that more than a minimum number of storage locations within dual port memory 702 are free and that the FIFO memory, dual port memory 702, is not yet nearing a full condition. The number of free locations indicated by the not high signal is equal to the value loaded into write cycle counter 710 when the load signal is asserted.

As data is written from an internal bus in the 40 MHz clock domain to dual port memory 702, transfers (writes) of data occur with each 40 MHz clock, as long as there is data to be written and dual port memory 702 has not reached a high condition, as indicated by de-assertion of the not high (NH) signal. When the 40 MHz clock and the 33 MHz clock coincide, the Enable A and Enable B signals are de-asserted (driven to a logic zero) on the preceding falling edge of the respective clock domain.

For example, when Enable A signal is in an inactive state, the not full (NF) signal generated by address compare unit 704 on line 746 does not propagate to OR gate 730 from AND gate 720. This condition results in a logic zero being introduced into the input of AND gate 714, which prevents a write request from being sent to dual port memory 702, unless the not high (NH) signal is asserted. If dual port memory 702 contains a number of free storage locations greater than the threshold for the not high signal indication on line 748, write cycle counter 710 will have been loaded with a value equal to the threshold value during the last operation when the Enable B signal was asserted. A high indication is indicated when the not high (NH) signal is in an inactive state.

Write counter 710 allows write operations to continue to dual port memory 702 when the Enable B signal is de-asserted (and results from address compare unit 704 may not be valid) because it indicates the number of free locations available at the last valid update.

If dual port memory 702 is nearing a full condition and the not high (NH) signal on line 748 is de-asserted, then if the Enable B signal is de-asserted, no write operations will occur because the signals into OR gate 730 will be zero. A deassertion of the not high (NH) signal indicates that fewer than some minimum number of locations are available to be written. Read cycles operate in a similar manner with read operations continuing when Enable signal A is de-asserted if read counter 712 is in a non-zero state.

Figure 8:
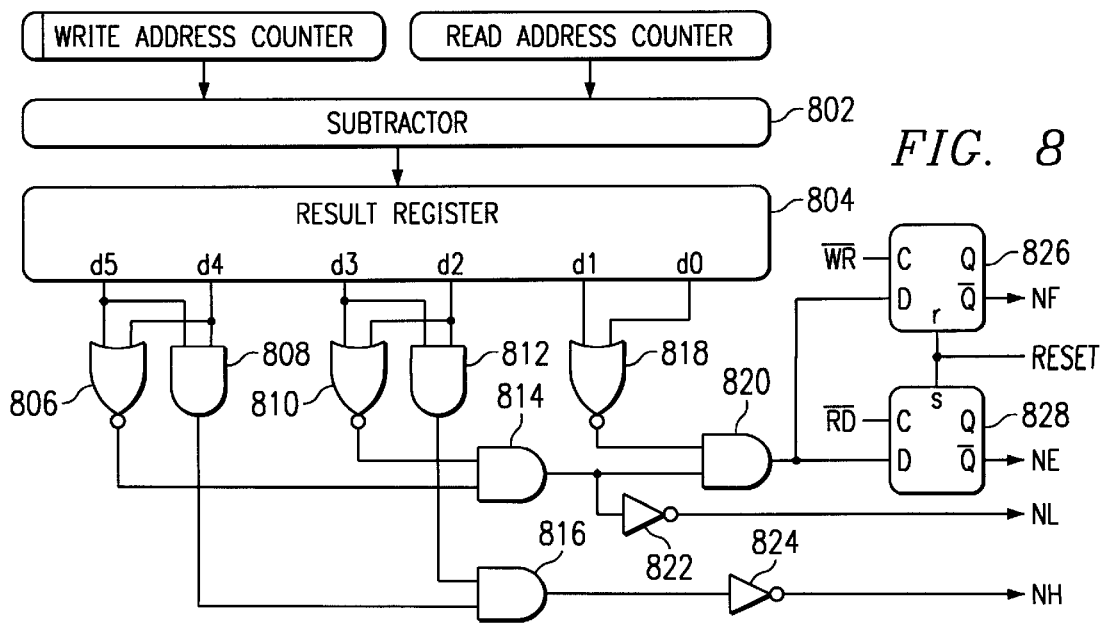
FIG. 8 is a state diagram for an address compare unit in accordance with a preferred embodiment of the present invention.

Turning now to FIG. 8, a schematic diagram of circuitry within address compare unit 704 in FIG. 7 is depicted in accordance with a preferred embodiment of the present invention. FIFO signals, also referred to as FIFO flags, are generated by comparing the read and write address register values. As noted above, a seventh bit which is always one is implemented as the msb of the write address to simplify comparisons.

Referring to FIG. 8, the read and write values are supplied to subtractor 802. The result of the subtraction is indicated by the six bit register 804. Bits 4 and 5 of register 804 are input to AND gate 808 and NOR gate 806. Bits 2 and 3 of register 804 are input to NOR gate 810 and AND gate 812. Bits 0 and 1 of register 804 are input to NOR gate 818.

The output of AND gate 808 and the output of AND gate 812 are input to AND gate 816 such that when bits 5:2 of the result register 804 are ones, the output of AND gate 816 is also a one value. The output of AND gate 816 is input to inverter 824 whose output is the NH or 'not high' signal. Thus when bits 5:2 of the result register are ones (as would be the case as the FIFO nears a full condition), the NH signal is asserted low, indicating said condition.

Similarly, the output of NOR gate 806 and the output of NOR gate 810 is input to AND gate 814 such that when bits 5:2 of the result register are zero, the output of AND gate 814 is a one. The output of AND gate 814 is input to inverter 822. The output of inverter 822 is the NL 'not low' signal. The circuit operate such that when bits 5:2 are zero, the outputs of NOR gates 806 and 810 are high, resulting in a high output form AND gate 814 and a low output from inverter 822, thereby deasserting (or driving low) the NL signal.

The output of AND gate 814 is also input to AND gate 820 which has the output of NOR gate 818 as its other input. AND gate 820 produces a high output when all bits of the result register 804 are zero. A zero condition is encountered when the FIFO is empty (and the read address increments to the write address following the last read) or when the FIFO is full (and the write address increments to the read address following the last write). The flag circuitry differentiates these two conditions by examining which control signal (read or write) resulted in the zero condition. Flip-flop 826 has the output of AND gate 820 as its input and an inverted write signal as the clock input. When the write signal is asserted, this will result in a logical one output at AND gate 820 if the last location has just been written and the FIFO is now full. When the write signal is de-asserted, flip-flop 826 clocks in the value of the AND gate 820 output. In this manner, the not-Q output of flip-flop 826 is the not full (NF) flag. Similarly, if a read operation resulted in the zero condition, the de-assertion of the read signal results in flip-flop 828 clocking the one level output of AND gate 820, resulting in the low assertion of the NE output. A reset signal causes flip-flop 826 to output a high level on the NF and causes flip-flop 828 to output a low level on the NE signal.

Thus, the present invention provides an improved method and apparatus for transferring data between different clock domains in a data processing system. The control circuitry illustrated in FIG. 7 allows a FIFO memory to avoid using control signal data when this data may be invalid because of transitioning addresses, but is able to continue transfer operations during these periods. If the FIFO memory has some minimum quantity of data stored for read operations or has some minimum locations free for write operations, transfer operations may continue until the counter reaches a zero value. As noted previously, the counter are reloaded when periods of coincidence do not exist and the corresponding not high or not low signal is asserted.

In addition, the present invention provides improved control between two clock domains by generating two output signals from a phase lock loop, where first output is of the same frequency and phase as the first clock domain, and second output signal is of the desired frequency for the second clock domain. Through the generation of both clock signals from a common clock source, the phase relationship between the two clock domains can be limited to a fixed number of cases, which allows these cases to be incorporated within the circuit design depicted in the present invention to allow data and indicator flags to be read and written without incurring a metastable state.

In the depicted example above, the 33 MHz clock signal and the 40 MHz clock signal are generated from a common source. In the case in which clock signals between two asynchronous clock domains are not generated from a common or base clock signals, the present invention provides a method and apparatus for determining when two asynchronous clock signals might coincide. A signal is generated to prevent the use of possibly corrected addresses at a FIFO address compare unit, such as address compare unit 704 in FIG. 7. This provides for reduced delay in communication between the two clock domains, resulting in reduced latency and higher throughput.

Figure 9:
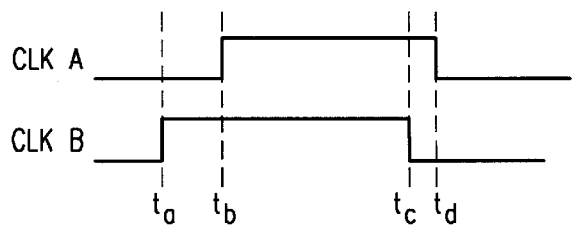
FIG. 9 is a diagram of a clock signal CLK A and a clock signal CLK B in accordance with a preferred embodiment of the present invention.

Turning now to FIG. 9, a diagram of a clock signal CLK A, a 40 MHz clock signal, and a clock signal CLK B, a 33 MHz clock signal, is depicted in accordance with a preferred embodiment of the present invention. If the period of clock signal CLK A and CLK B are known to some accuracy and the duration between time Ta and Td are measured, the duration between time Ta and time Td may be predicted and a signal may be generated to inhibit use of possibly corrupted data when signals are changing.

This method may be applied to fully asynchronous clocks operating near a constant frequency. The present invention also may be employed to sense if the transition between the clock signals does not take place when expected, as might be the result of clock jitter or unexpected drift. Further communication between the clock domains may then be disabled until some number of clock transitions fall within the predicted transition time, indicating that a relatively constant frequency has been re-established.

Figure 10:
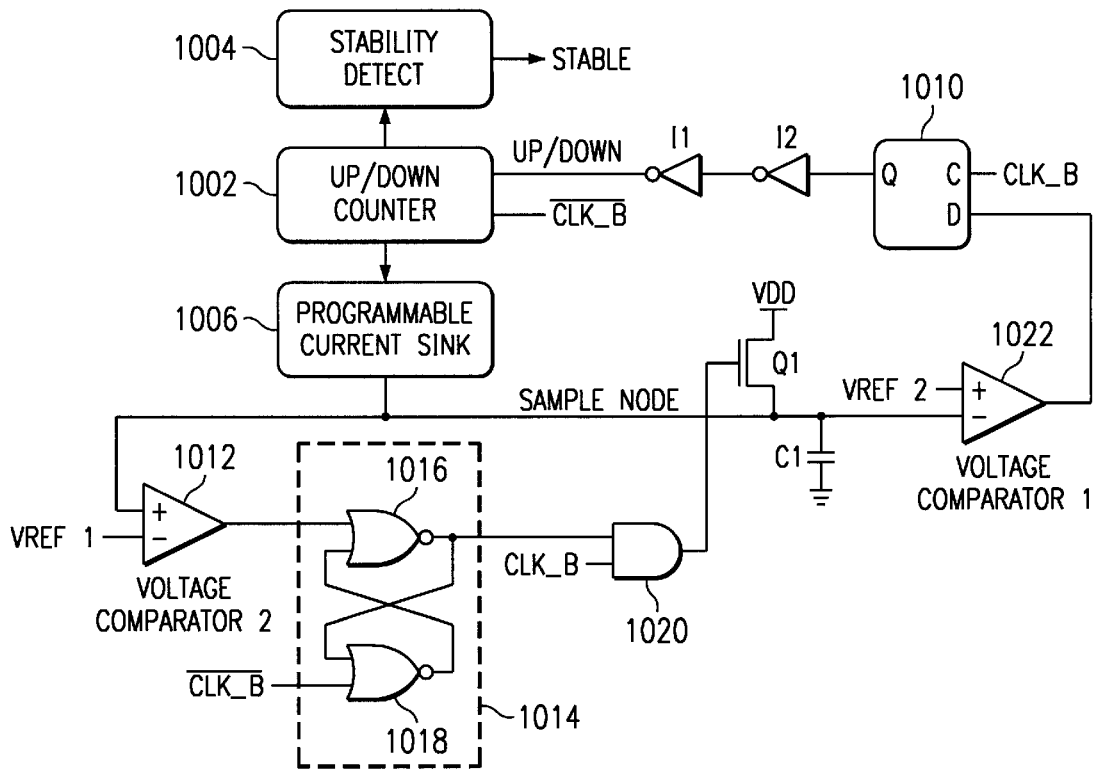
FIG. 10 is a frequency determination circuit in accordance with a preferred embodiment of the present invention.

The first part of this process includes a frequency comparison process. Turning to FIG. 10, a frequency determination circuit is depicted in accordance with a preferred embodiment of the present invention. This circuit is applied to both clock signals CLK A and CLK B. Frequency determination circuit 1000 produces a counter value, which is a digital representation of the frequency. This counter value is proportional to the frequency of the input and creates a scaled sawtooth wave signal from an input clock signal.

Frequency determination circuit 1000 includes an up/down counter 1002, a stability detect circuit 1004, and programmable current sink 1006. Additionally, up/down counter 1002 is connected to a clock signal at input 1008 via D flip-flop 1010, and inverters I1 and I2, which are used to provide fast edges in the signal. In the depicted example, the clock signal is a CLK B. Frequency determination circuit 1000 also includes an output comparator 1012 having its output connected to latch 1014. Comparator 1012 has one input connected to programmable current sink 1006 and a second input connected to a reference voltage VREF 2. Latch 1014 is formed by NOR gates 1016 and 1018. A second input into latch 1014 is /CLK B. The symbol "/" indicates that the signal is the opposite of CLK B. The output of latch 1014 is connected to AND gate 1020 with the output of AND gate 1020 connected to the gate of transistor Q1. Frequency determination circuit 1000 also includes a capacitor C1 and a voltage comparitor 1022. Capacitor C1 has one end connected to current source 1006 and a second end connected to a lower power supply voltage, such as ground. The output of comparator 1022 is connected to an input of D flip-flop 1010. One input of comparator 1022 is connected to capacitor C1, while the other input of comparator 1022 is connected to a reference voltage VREF 1.

In frequency determination circuit 1000, the value of counter 1002 controls the magnitude of programmable current sink 1006. The greater of value of counter 1002, the greater the current sunk by programmable current sink 1006. This greater current sink results in capacitor C1 discharging at a faster rate. When the charge rate is sufficiently fast, voltage across capacitor C1 attains a voltage sufficiently low to cause comparator 1022 to output a signal at a high level, resulting in counter 1002 being decremented. If the current supplied by programmable current sink 1006 is not sufficient to cause capacitor C1 to reach a value to trip comparator 1022, counter 1002 is incremented by one. This architecture results in counter 1002 homing in a value, which produces a discharge time similar to that of the period of clock signal CLK B. The value of counter 1002 serves as a representation of a frequency of clock signal CLK B.

When the input clock transitions to high level, capacitor C1 is charged through transistor Q1 until a voltage defined by voltage VREF 1 at the input of comparator 1012 is attained. Delays through AND gate 1020 and latch 1016 results in a voltage somewhat greater than voltage VREF 2 being attained before transistor Q1 is turned off. The value of voltage VREF 1 may be selected with these delays being considered to attain the desired level.

Stability detect circuit 1004 generates a signal STABLE to indicate whether the input clock signal, clock signal CLK B in the depicted example, is stable. If counter 1002 is incremented or decremented only for some sequence of clock signals, this serves as an indication that the clock signal may have changed frequency. Other criteria for stability other than frequency also may be implemented in stability detect circuit 1004 in accordance with a preferred embodiment of the present invention.

Figure 11:
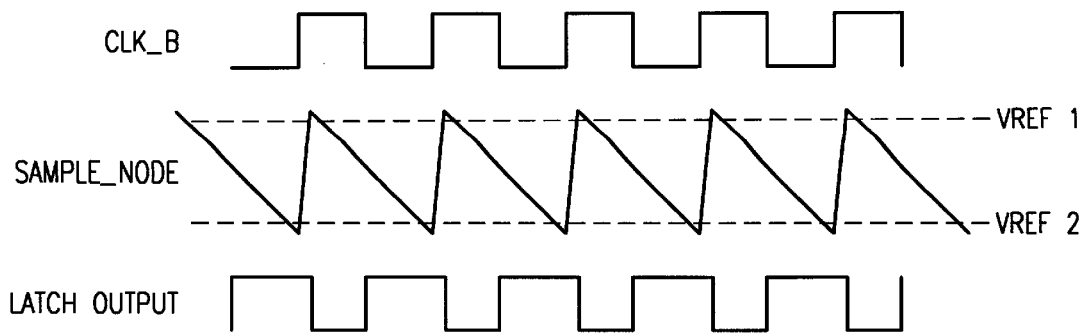
FIG. 11 is a diagram of the input clock and the voltage at capacitor C1 in accordance with a preferred embodiment of the present invention.

Turning now to FIG. 11, a diagram of the input clock and the voltage at capacitor C1 is depicted in accordance with a preferred embodiment of the present invention. The diagram depicts the voltages for clock signal CLK B, the output of latch 1014 and node 1024. Latch 1014 is set when clock signal CLK B is low such that the output of latch 1014 is high. When clock signal CLK B transitions to a high level, both inputs to AND gate 1020 are a logic one, resulting in a high output such that transistor Q1 conducts current and capacitor C1 charges. When the voltage exceeds VREF 1, the output of comparator 1012 transitions to a high state, resetting latch 1014. This condition results in a logic zero at the output of latch 1014. In turn, a logic zero also is generated at the output of AND gate 1020, turning off transistor Q1.

Figure 12:
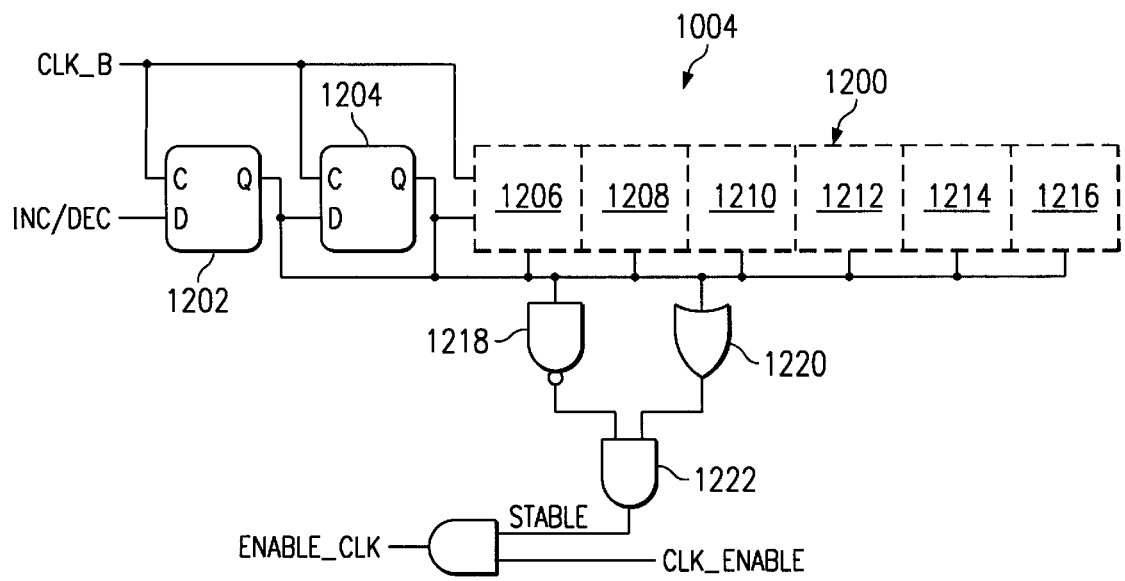
FIG. 12 is a logic diagram of the stability detect circuit in accordance with a preferred embodiment of the present invention.

Turning now to FIG. 12, a logic diagram of the stability detect circuit from FIG. 10 is depicted in accordance with a preferred embodiment of the present invention. Stability detect circuit 1004, in the depicted example, uses changes in frequency based on increment and decrement signals from comparator 1022 as a criteria for stability. Stability detect circuit 1004 includes a shift register 1200 formed by D flip-flops 1202, 1204, 1206, 1208, 1210, 1212, 1214, and 1216 in the depicted example. The input clock signal, which is clock signal CLK B in the depicted example, is connected to the input of shift register 1200 along with an increment/decrement signal from comparator 1022. Stability detect circuit 1004 also includes AND gate 1218 and OR gate 1220. The outputs from shift registers 1200 are fed into NAND gate 1218 and OR gate 1220, whose outputs are fed into AND gate 1222. The output of AND gate 1222 is fed into AND gate 1224. A signal CLK_ENABLE (originating from latch 1538 in FIG. 15 below) also is input into AND gate 1224 to generate signal ENABLE_CLK, which is used as an ENABLE A or ENABLE B input into AND gates 718, 720 or 726, and 728 because stability detect circuit 1004 is implemented for each clock domain. Stability detect circuit 1004 provides a STABLE signal (thereby enabling the propagation of the signal CLK_ENABLE) only if both zero values and one values are present within shift register 1200. If a condition of all logic ones or logic zeros are present within shift register 1200, a zero will be output by NAND gate 1218 or OR gate 1220, resulting in a logic zero value for the signal STABLE, causing signal ENABLE_CLK to be a logic zero.

Although the example refers to clock signal, CLK B, frequency detect circuit 1000 in FIG. 10 is implemented for both clock domains. This circuit also serves to produce a sawtooth waveform, which is the same period and relative phase as the input clock. The sawtooth waveform is derived from node 1024 in FIG. 10. The sawtooth waveform has a linear slope because the capacity C1 is discharged by programmable current sink 1006, which is a constant current device. The magnitude of the minimum and maximum voltage of this waveform is determined by voltages VREF 1 and VREF 2. If the sawtooth waveform is sampled at the edge of the other clock domain, the magnitude of the sawtooth indicates the phase of that clock, as can be seen with reference to FIG. 13, which is a diagram of clock signals from two domains and a sawtooth waveform is depicted in accordance with a preferred embodiment of the present invention. Sample edge 1300 indicates the phase of clock signal CLK B relative to CLK A, while sample edge 1302 indicates the phase of clock signal CLK A relative to CLK B.

From frequency detect circuit 1000, a process is employed to determine the ratio between two clock frequencies, which is the ratio between the values of counter 1002 for the first clock signal and counter 1002 as implemented for the second clock signal. Additionally, the process includes expressing the phase as a voltage which ranges from voltage VREF 1, which indicates zero phase, to VREF 2, which indicates 360 degree phase. The ratio and the sensed phase is used to predict the phase of the next clock transition.

Figure 13:
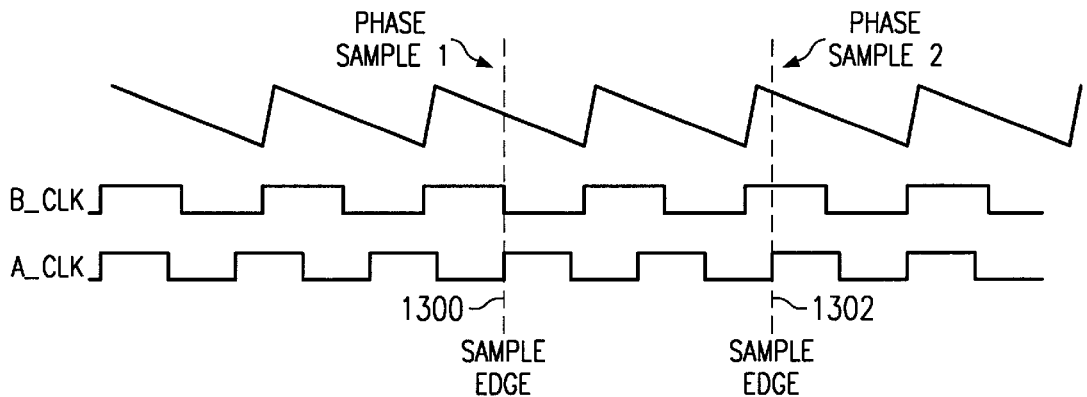
FIG. 13 is which is a diagram of clock signals from two domains and a sawtooth waveform in accordance with a preferred embodiment of the present invention.
Figure 14:
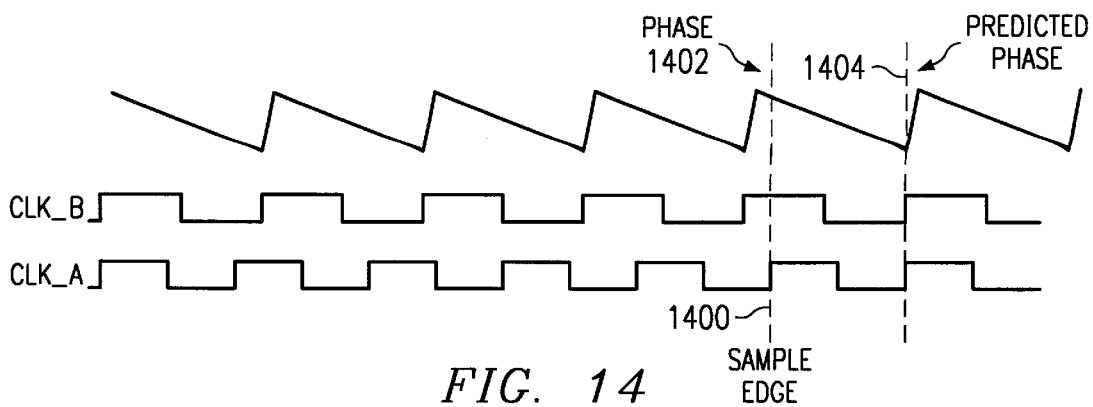
FIG. 14 is a diagram illustrating a prediction of rising clock edges in accordance with a preferred embodiment of the present invention.

From FIG. 13, it can be seen that some percentage of clock signal CLK B occurs during a period for clock signal CLK A, which may be expressed as (B_counter)/(A_counter)=Clock Ratio=CR in which B_counter is the counter value of counter 1002 for clock signal CLK B while A_counter is the value of counter 1002 for clock signal CLK A. Using the example counter values of 330 and 400, the clock ratio is 330/400=0.825. As can be seen, approximately ⅚ of a clock signal CLK B occurs during a period of a clock signal CLK A. As a result, if the phase of clock signal CLK B at some rising edge of clock signal CLK A is around ⅙, then the edges of clock signal CLK A and clock signal CLK B will occur in near coincidence at the next rising edge of clock signal ClK A as can be seen in FIG. 14. FIG. 14 is a diagram illustrating a prediction of rising clock edges. In the depicted example, sample edge 1400 results in phase 1402 for clock signal CLK B that is around ⅙ which results in a predicted phase 1404 for the next rising edge of CLK A. In the depicted example, if a condition of ⅙ is detected, then the usage of FIFO flags may be inhibited for the next rising clock edge. In other words, if the phase measured is near (1−CR)*360 degrees, then the enable signal for that clock domain is deasserted.

The frequency determination circuit of FIG. 10 produces a sawtooth which decreases in voltage as phase increases. If the phase voltage is near CR * (VREF1−VREF2), then the enable signal is deasserted.

Figure 15:
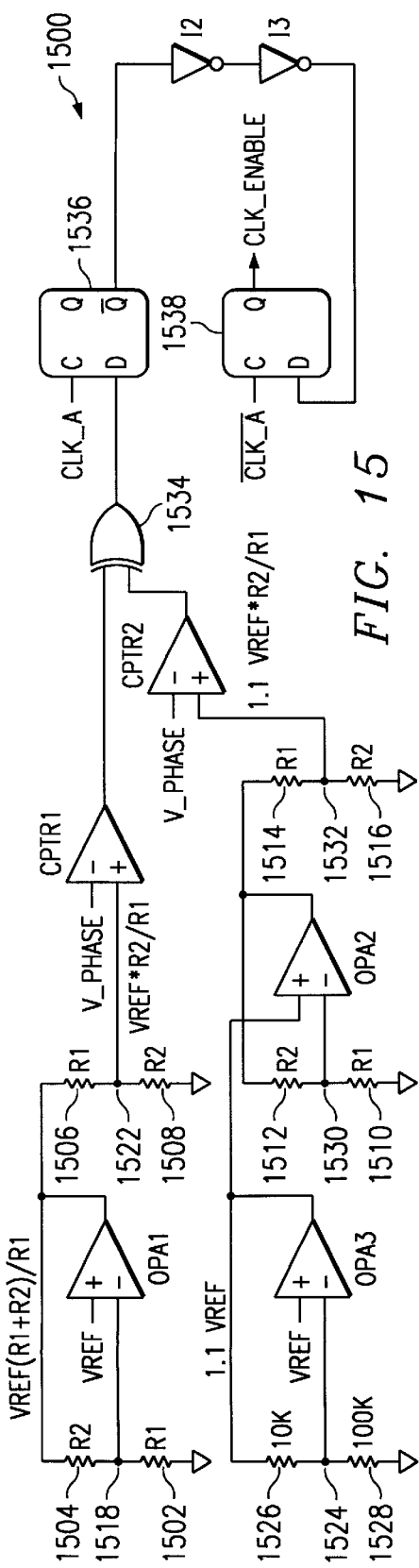
FIG. 15 is a schematic diagram of a circuit implementing a process for generating an ENABLE signal or a INHIBIT signal in accordance with a preferred embodiment of the present invention.

Turning now to FIG. 15, a schematic diagram of a circuit implementing a process for generating an ENABLE signal or a INHIBIT signal is depicted in accordance with a preferred embodiment of the present invention. In FIG. 15, the example is described using a voltage VREF for VREF2 at zero volts. Circuit 1500 is an analog of an implementation for a process for comparing the magnitude of the sawtooth phase voltage with CR*VREF. A second comparison of one hundred ten (110) percent of CR*VREF1 provides a comparison window. In FIG. 15, R1 and R2 are programmable resistors who values are defined by A_counter and B_counter values, respectively, from the frequency determination circuit depicted in FIG. 10 and which is implemented for each clock domain. The values for the counters for clock signals CLK A and CLK B are used to set the values of programmable resistors 1502, 1504, 1506, 1508, 1510, 1512, 1514, and 1516 in circuit 1500. Resistors 1502, 1506, 1510 and 1514 have a resistance value R1 controlled by a value of the counter for clock signal CLK A while resistors 1504, 1508, 1512, and 1516 have a resistance value of R2 defined by the value of the counter for clock signal CLK B. The ratio of the resistances defines the circuit operations such that they may be selected for operating conditions, such as, for example, low power, noise immunity, etc. as determined by process requirements.

Resistors 1502 and 1504 form a first voltage divider with an output node 1518, which is connected to the input of operational amplifier OPA1. The positive terminal of operational amplifier OPA1 is connected to the voltage VREF. The output of operational amplifier OPA1 is connected to node 1520 which is also the supply of the voltage divider. The voltage at node 1518=(A*R1)/(R1+R2) with A being the voltage of node 1520, R1 being the value for resistor 1502, and R2 being the value for resistor 1504.

Since operational amplifier OPA1 will drive the output until the plus and minus inputs are equal, node 1518 will be driven to a level equal to voltage VREF such that voltage VREF =(A*R1)/(R1+R2) and with A=(voltage VREF(R1+R2))/R1. Node 1520 also serves as an input to a second resistance voltage divider having node 1522 as its output in which resistors 1506 and 1508 form the voltage divider. The voltage of the node can be expressed as:

$$C = Vin*R2/(R1+R2) = VREF(R1+R2)/R1*R2/(R1+R2) = VREF*R2/R1$$

In a similar manner, the reference voltage VREF is scaled to 1.1 VREF at node 1524 using resistors 1526 and 1528, which are 10K ohm and 100K ohm resistors resulting in the output of operational amplifier OPA2 being 1.1*VREF*(R2/R1)/R1 with R1 being the resistance value of resistor 1510 and R2 being the resistance value of resistor 1512. Resistors 1512 and 1510 form a voltage divider with an output at node 1530, while resistors 1514 and 1516 form yet another voltage divider with an output being at node 1532.

Node 1522 is input into comparator CMPTR1 with node 1532 being input into comparator CMPTR2. Signal V_PHASE, which is the sawtooth waveform generated by frequency detection circuit 1000 in FIG. 10, is input into the positive terminals into positive comparators into CMPTR1 and CMPTR2. When the voltage of signal V_PHASE is more than less (R1/R2)*VREF, but more than 1.1 (R2/R1) *VREF, the output of XOR gate 1534 is a logic one. The output of XOR gate 1534 is connected to D flip-flop 1536 and inverters T2 and T3 with the output of inverter I3 being connected to D flip-flop 1538. If the condition occurs when signal CLK A is rising, ENABLE signal ENABLE_40 will be driven low at the falling edge of clock signal CLK A.

In other words, if the phase of clock signal CLK B is approximately equal to the value (B_counter/A_counter)* (VREF1−VREF2) when clock signal CLK A transitions, a possibility of unreliable data from the FIFO address compare unit exists. Upon sensing this condition, signal ENABLE_40 is driven low so that data transfers do not occur at this time.

Figure 16:
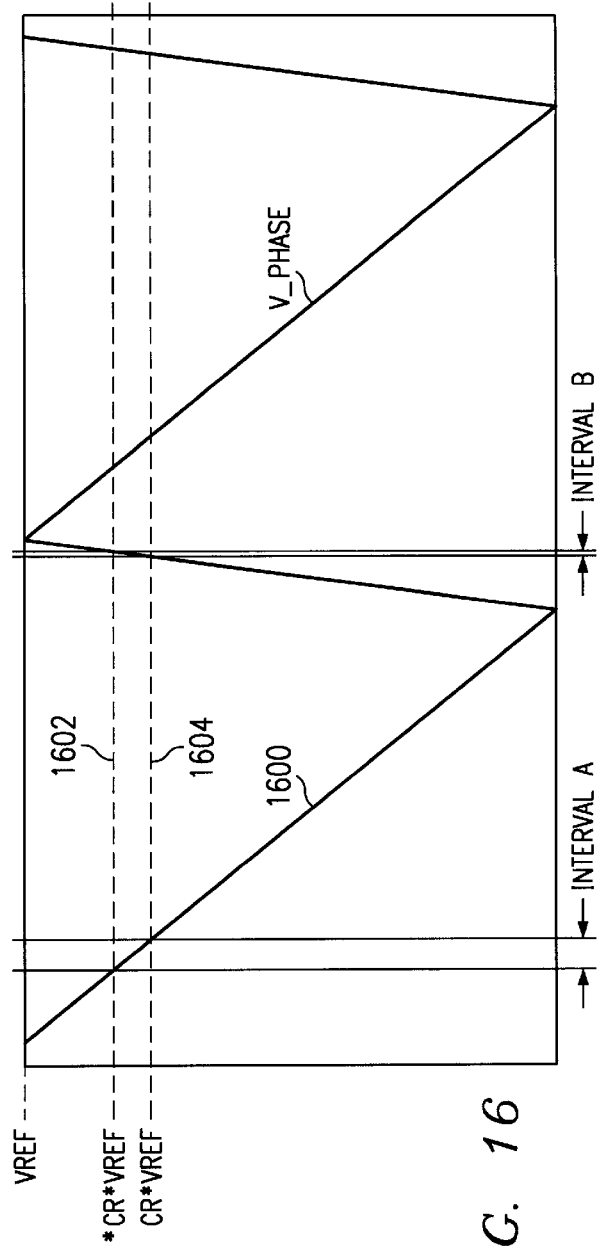
FIG. 16 is a diagram of a sawtooth waveform in accordance with a preferred embodiment of the present invention.

Turning now to FIG. 16, a diagram of a sawtooth waveform is depicted in accordance with a preferred embodiment of the present invention. This figure depicts the sawtooth waveform levels and the compare levels of circuit 1500 in FIG. 15. Signal 1600 is a waveform for signal V_PHASE from FIG. 15, wherein V_PHASE is the phase voltage. When the phase voltage is above CR*VREF, the voltage of node 1522 in FIG. 15, and below 1.1*VREF*CR, the voltage of node 1532 in FIG. 15, XOR gate 1534 outputs a logic one, which is then captured by flip-flop 1556. The inverted output of flip-flop 1556 is input into inverters T2 and T3 for edge speed and then input into flip-flop 1538.

When signal 1600 has a voltage between levels 1602 and 1604, the output of XOR gate from XOR gate 1534 from FIG. 15 is high. Such a situation may occur at interval A or interval B as illustrated in FIG. 16. An inhibit signal may be implemented in the depicted example such that when clock signal is first asserted, the output of XOR gate 1534 is held low for some period of time. Alternatively, since the falling edge of signal 1600 is much faster than the rising edge, the occurrence of inhibiting FIFO compare data because of an interval B event would be much lower than that of an interval A event. Thus, the present invention may provide a fail "safe" by indicating a higher circumstance of potentially invalid FIFO results than really exists as opposed to missing possible problem events.

The output of XOR gate 1534 in FIG. 15 will transition from a zero to a one and back to a zero as the V_PHASE voltage (=sample node) traverses the voltage window defined by CR*VREF and 1.1 CR*VREF. The window (rather than a single voltage compare) causes the output of XOR gate 1534 to be stable when the indication is that the next rising edge of CLK__A may coincide with a rising edge of CLK__B. If the output of XOR gate 1534 is sampled when it is transitioning (as would be the case if CLK__A rising edge occurs in proximity to the 1.1 CR*VREF level), an intermediate level may be sampled, but the occurrence of said sampling is indicative of a phase relationship where the next rising edge of CLK__A would not coincide with a rising edge of CLK__B. In other words, the window provides a method to shift possible intermediate levels being sampled by flip-flop 1536 to a time which does not coincide to the condition where CLK__A and CLK__B edges might coincide.

The occurrence of intermediate levels at this time is reduced by the dual flip-flop and inverters of FIG. 15. However, if intermediate levels are sampled, the circuit may falsely indicate a potential clock coincidence condition when none exists. This provides a "fails safe" architecture for metastable conditions, and as stated earlier, the window implementation causes XOR gate 1534 to output a strong level in advance of being sampled when phase relationships are such that the next rising edge of CLK__A would coincide with a rising edge of CLK__B.

It should be noted that in this specification, the preferred embodiment describes and architecture where read and write counters increment on the rising edge of the clock. In further methods described, the condition of coincident rising edges between the two clock domains is used as the condition for which use of flag information is inhibited. If a circuit is implemented where the address counters are incremented at some other time, then the detection of using flag information while addresses are changing would involve sensing a different condition, or may include a delay from a sensed condition such as rising or falling clock edges.

Thus, the present invention may provide a fail "safe" by indicating a higher circumstance of potentially invalid FIFO results than really exists as opposed to missing possible problem events.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

What is claimed is:

1. A method for transferring data from a first clock domain using a first clock signal to a second clock domain using a second clock signal, the method comprising the steps of:
   generating a first enable signal indicating a phase relationship between the first clock signal and the second clock signal;
   generating a plurality of flag signals for use in controlling the transfer of data from the first clock domain to the second clock domain;
   transferring data from the first clock domain to the second clock domain using the first enable signal and one or more of the plurality of flag signals; and
   allowing for a continuation of a data transfer based on a previously known state of the plurality of flags such that an absence of a clock delay occurs during periods when one or more of the plurality of flags are determined to be unreliable.

2. A method for transferring data from a first clock domain using a first clock signal to a second clock domain using a second clock signal, the data being transferred between clock domains using a first memory operation from the first clock domain to a memory and a second memory operation from the memory to the second clock domain, the method comprising the steps of:
   generating at least one first memory state flag signal associated with a state of the memory;
   generating a first enable signal indicating a phase relationship between the first clock signal and the second clock signal;
   storing a first stored memory condition associated with a first memory state flag signal;
   if the first enable signal is asserted, conditionally executing the first memory operation using a first memory state flag signal; and
   if the first enable signal is not asserted, conditionally executing the first memory operation using the first stored memory condition.

3. The method of claim 2 wherein the first enable signal indicates a first time period during which the generation of a first memory state flag is reliable and a second time period during which the generation of a first memory state flag is unreliable.

4. The method of claim 3 wherein the second time period is associated with a coincident condition between the first clock signal and the second clock signal.

5. The method of claim 2 wherein the step of generating a first memory state flag signal is in response to a comparison of an address for the first memory operation to an address for the second memory operation.

6. The method of claim 5 wherein a first memory state flag signal indicates an available memory location for performing the first memory operation.

7. The method of claim 6 further comprising:
   generating a plurality of memory state flag signals associated with a state of the memory in response to a comparison of an address for the first memory operation to an address for the second memory operation, wherein at least one of the memory state flag signals indicates a degree of fullness of the memory and at least one of the memory state flag signals indicates a degree of emptiness of the memory.

8. The method of claim 2 wherein the first stored memory condition is a data value representing a number of available memory locations for performing a first memory operation.

9. The method of claim 8 wherein the data value is stored in a first memory operation cycle counter, and wherein the data value is decremented by the first memory operation cycle counter when a first memory operation is executed.

10. The method of claim 9 wherein the first memory operation conditionally executes upon a determination that the data value is non-zero.

11. The method of claim 9 wherein the first stored memory condition is stored by loading the first memory operation cycle counter with a predetermined data value when the first enable signal is asserted and a first memory state flag signal is asserted.

12. The method of claim 2 wherein the first clock signal and the second clock signal are generated from a base clock signal using a clock circuit.

13. The method of claim 12 wherein the clock circuit comprises:

phase locked loop having an input and an output, wherein the input is configured to receive the base clock signal;

a first divider having an input and an output, wherein the input is connected to the output of the phase locked loop and the first clock signal is connected to the output of the first divider; and a second divider having an input and an output, wherein the input is connected to the output of the phase locked loop and the second clock signal is connected to the output of the second divider.

14. The method of claim 12 wherein the clock circuit comprises:

a first divider, wherein an input of the first divider is connected to an output of a voltage controlled oscillator, and wherein an output of the first divider provides the first clock signal;

a second divider, wherein an input of the second divider is connected to the output of a voltage controlled oscillator, wherein an output of the second divider is connected to an input of a phase comparator, and wherein the output of the second divider provides the second clock signal;

the voltage controlled oscillator, wherein an input of the voltage controlled oscillator is connected to an output of a filter;

the filter, wherein an input of the filter is connected to an output of the phase comparator; and the phase comparator, wherein an input of the phase comparator is configured to receive a base clock signal.

15. The method of claim 12 wherein the step of generating the first enable signal comprises:

inputting the first clock signal into a parallel-input, serial-output, cyclic shift register;

loading a predetermined data value into the shift register using the parallel inputs, wherein a number of bits representing the predetermined data value equals a length of the shift register, and wherein the length of the shift register corresponds to a number of clocks in which the phase relationship repeats;

shifting the shift register according to the first clock signal, wherein the serial output of the shift register provides the first enable signal.

16. The method of claim 12 wherein the step of generating the second enable signal comprises:

inputting the second clock signal into a parallel-input, serial-output, cyclic shift register;

loading a predetermined data value into the shift register using the parallel inputs, wherein a number of bits representing the predetermined data value equals a length of the shift register, and wherein the length of the shift register corresponds to a number of clocks in which the phase relationship repeats;

shifting the shift register according to the second clock signal, wherein the serial output of the shift register provides the second enable signal.

17. The method of claim 2 further comprising:

generating at least one second memory state flag signal associated with a state of the memory;

generating a second enable signal indicating a phase relationship between the first clock signal and the second clock signal, wherein the second enable signal indicates a third time period during which the generation of a second memory state flag is reliable and a fourth time period during which the generation of a second memory state flag is unreliable, wherein the fourth time period is associated with a coincident condition between the first clock signal and the second clock signal;

storing a second stored memory condition associated with a second memory state flag signal;

if the second enable signal is asserted, conditionally executing the second memory operation using a second memory state flag signal; and if the second enable signal is not asserted, conditionally executing the second memory operation using the second stored memory condition.

18. The method of claim 17 further comprising generating a plurality of memory state flag signals associated with a state of the memory in response to a comparison of an address for the first memory operation to an address for the second memory operation, wherein at least one of the memory state flag signals indicates a degree of fullness of the memory and at least one of the memory state flag signals indicates a degree of emptiness of the memory, and wherein a second memory state flag signal indicates an available memory location for performing the second memory operation.

19. The method of claim 17 wherein the second stored memory condition is a data value representing a number of available memory locations for performing a second memory operation, wherein the data value is stored in a second memory operation cycle counter, wherein the second stored memory condition is stored by loading the second memory operation cycle counter with a predetermined data value when the second enable signal is asserted and a second memory state flag signal is asserted, wherein the data value is decremented by the second memory operation cycle counter when a second memory operation is executed, and wherein the second memory operation conditionally executes upon a determination that the data value is non-zero.

20. A data processing system comprising:

a first clock domain using a first clock signal;

a second clock domain using a second clock signal;

a memory responsive to a first memory operation for transferring data from the first clock domain to the memory and responsive to a second memory operation for transferring data from the second clock domain to the memory;

a first flag signal generating means for generating at least one first memory state flag signal associated with a state of the memory;

a first enable signal generating means for generating a first enable signal indicating a phase relationship between the first clock signal and the second clock signal;

a first storage means for storing a first stored memory condition associated with a first memory state flag signal;

a first execution means for executing a first memory operation, wherein if the first enable signal is asserted, conditionally executing the first memory operation using a first memory state flag signal, and wherein if the first enable signal is not asserted, conditionally executing the first memory operation using the first stored memory condition.

21. The data processing system of claim 20 wherein the first enable signal indicates a first time period during which the generation of a first memory state flag is reliable and a second time period during which the generation of a first memory state flag is unreliable.

22. The data processing system of claim 21 wherein the second time period is associated with a coincident condition between the first clock signal and the second clock signal.

23. The data processing system of claim 20 wherein the first flag signal generation means compares an address for the first memory operation to an address for the second memory operation.

24. The data processing system of claim 23 wherein a first memory state flag signal indicates an available memory location for performing the first memory operation.

25. The data processing system of claim 24 wherein the first flag signal generation means generates a plurality of memory state flag signals associated with a state of the memory, wherein at least one of the memory state flag signals indicates a degree of fullness of the memory and at least one of the memory state flag signals indicates a degree of emptiness of the memory.

26. The data processing system of claim 20 wherein the first stored memory condition is a data value representing a number of available memory locations for performing a first memory operation.

27. The data processing system of claim 26 wherein the first storage means is a first memory operation cycle counter, and wherein the data value is decremented by the first memory operation cycle counter when a first memory operation is executed.

28. The data processing system of claim 27 wherein the first memory operation conditionally executes upon a determination that the data value is non-zero.

29. The data processing system of claim 27 wherein the first stored memory condition is stored by loading the first memory operation cycle counter with a predetermined data value when the first enable signal is asserted and a first memory state flag signal is asserted.

30. The data processing system of claim 20 wherein the first clock signal and the second clock signal are generated from a base clock signal using a clock circuit.

31. The data processing system of claim 30 wherein the clock circuit comprises:

phase locked loop having an input and an output, wherein the input is configured to receive the base clock signal;

a first divider having an input and an output, wherein the input is connected to the output of the phase locked loop and the first clock signal is connected to the output of the first divider; and a second divider having an input and an output, wherein the input is connected to the output of the phase locked loop and the second clock signal is connected to the output of the second divider.

32. The data processing system of claim 30 wherein the clock circuit comprises:

a first divider, wherein an input of the first divider is connected to an output of a voltage controlled oscillator, and wherein an output of the first divider provides the first clock signal;

a second divider, wherein an input of the second divider is connected to the output of a voltage controlled oscillator, wherein an output of the second divider is connected to an input of a phase comparator, and wherein the output of the second divider provides the second clock signal;

the voltage controlled oscillator, wherein an input of the voltage controlled oscillator is connected to an output of a filter;

the filter, wherein an input of the filter is connected to an output of the phase comparator; and the phase comparator, wherein an input of the phase comparator is configured to receive a base clock signal.

33. The data processing system of claim 30 wherein the first enable signal generating means comprises:

a parallel-input, serial-output, cyclic shift register using the first clock signal, wherein the shift register loads a predetermined data value using the parallel inputs, wherein a number of bits representing the predetermined data value equals a length of the shift register, and wherein the length of the shift register corresponds to a number of clocks in which the phase relationship repeats, and wherein the serial output of the shift register provides the first enable signal.

34. The data processing system of claim 30 wherein the second enable signal generating means comprises:

a parallel-input, serial-output, cyclic shift register using the second clock signal, wherein the shift register loads a predetermined data value using the parallel inputs, wherein a number of bits representing the predetermined data value equals a length of the shift register, and wherein the length of the shift register corresponds to a number of clocks in which the phase relationship repeats, and wherein the serial output of the shift register provides the second enable signal.

35. The data processing system of claim 20 further comprising:

a second flag signal generating means for generating at least one second memory state flag signal associated with a state of the memory;

a second enable signal generating means for generating a second enable signal indicating a phase relationship between the first clock signal and the second clock signal, wherein the second enable signal indicates a third time period during which the generation of a second memory state flag is reliable and a fourth time period during which the generation of a second memory state flag is unreliable, wherein the fourth time period is associated with a coincident condition between the first clock signal and the second clock signal;

a second storage means for storing a second stored memory condition associated with a second memory state flag signal;

a second execution means for executing a second memory operation, wherein if the second enable signal is asserted, conditionally executing the second memory operation using a second memory state flag signal, and wherein if the second enable signal is not asserted, conditionally executing the second memory operation using the second stored memory condition.

36. The data processing system of claim 35 wherein the second flag signal generation means generates a plurality of memory state flag signals associated with a state of the memory, wherein at least one of the memory state flag signals indicates a degree of fullness of the memory and at least one of the memory state flag signals indicates a degree of emptiness of the memory, and wherein a second memory state flag signal indicates an available memory location for performing the second memory operation.

37. The data processing system of claim 35 wherein the second stored memory condition is a data value representing a number of available memory locations for performing a second memory operation, wherein the second storage means is a second memory operation cycle counter, wherein the second stored memory condition is stored by loading the second memory operation cycle counter with a predetermined data value when the second enable signal is asserted and a second memory state flag signal is asserted, wherein the data value is decremented by the second memory operation cycle counter when a second memory operation is executed, and wherein the second memory operation conditionally executes upon a determination that the data value is non-zero.

* * * * *